United States Patent
Ko et al.

(10) Patent No.: US 9,126,867 B2
(45) Date of Patent: Sep. 8, 2015

(54) ADDITIVE INCLUDING POLYCARBOXYLIC COPOLYMER AND CEMENT COMPOSITION COMPRISING THE SAME

(71) Applicant: LG CHEM, LTD., Seoul (KR)

(72) Inventors: Chang Bum Ko, Daejeon (KR); Young-Min Kim, Daejeon (KR); Imgyu Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/413,377

(22) PCT Filed: Aug. 20, 2013

(86) PCT No.: PCT/KR2013/007444
§ 371 (c)(1),
(2) Date: Jan. 7, 2015

(87) PCT Pub. No.: WO2014/030900
PCT Pub. Date: Feb. 27, 2014

(65) Prior Publication Data
US 2015/0175484 A1 Jun. 25, 2015

(30) Foreign Application Priority Data
Aug. 21, 2012 (KR) .................... 10-2012-0091228

(51) Int. Cl.
C04B 26/04 (2006.01)
C04B 24/26 (2006.01)
C08F 220/28 (2006.01)
C04B 16/04 (2006.01)
C08F 220/38 (2006.01)

(52) U.S. Cl.
CPC ............. *C04B 24/2694* (2013.01); *C04B 16/04* (2013.01); *C04B 24/26* (2013.01); *C04B 24/2605* (2013.01); *C04B 26/04* (2013.01); *C08F 2220/285* (2013.01); *C08F 2220/382* (2013.01)

(58) Field of Classification Search
CPC .... C04B 26/04; C04B 24/26; C04B 24/2605; C04B 24/2647; C04B 24/2694; C08F 2220/285; C08F 2220/382
USPC .................... 524/2, 558; 526/287, 318.4, 320
See application file for complete search history.

(56) References Cited

U.S. PATENT DOCUMENTS

| | | | |
|---|---|---|---|
| 4,962,173 A | 10/1990 | Kinoshita et al. | |
| 6,187,841 B1 | 2/2001 | Tanaka et al. | |
| 6,939,402 B2 * | 9/2005 | Choi et al. | 106/724 |

FOREIGN PATENT DOCUMENTS

| | | |
|---|---|---|
| JP | 5838380 A | 3/1983 |
| JP | 63285140 A | 11/1988 |
| JP | 1226757 A | 9/1989 |
| JP | 2163108 A | 6/1990 |
| JP | 4209613 A | 7/1992 |
| JP | 2011-256064 | 11/2011 |
| JP | 2011-256064 | 12/2011 |
| JP | 2011256064 A | 12/2011 |
| KR | 10-1997-0006222 | 2/1997 |
| KR | 10-0247526 | 3/2000 |
| KR | 10-2005-0102835 | 10/2005 |
| KR | 1020050102835 | 10/2005 |
| KR | 10-2006-0062321 | 6/2006 |
| KR | 1020060062321 A | 6/2006 |
| KR | 10-0948196 | 3/2010 |
| KR | 100948196 | 3/2010 |
| KR | 100948196 B1 | 3/2010 |
| KR | 10-2010-0070909 | 6/2010 |
| KR | 1020100070909 A | 6/2010 |

* cited by examiner

*Primary Examiner* — Vu A Nguyen
(74) *Attorney, Agent, or Firm* — Dentons US LLP

(57) ABSTRACT

Disclosed are an additive for cement compositions that includes a polycarboxylic copolymer and a cement composition including the same and, more particularly, an additive for cement compositions that includes a polycarboxylic copolymer and/or a salt thereof, wherein the polycarboxylic copolymer is a copolymer of a monomer mixture including an alkoxy polyalkylene glycol mono(meth)acrylic acid ester-based monomer, a (meth)acrylic acid-based monomer, a (meth)acrylic acid ester-based monomer, and a polyoxyalkylene alkenyl ether sulfate salt and a cement composition including the same.

17 Claims, No Drawings

ADDITIVE INCLUDING POLYCARBOXYLIC COPOLYMER AND CEMENT COMPOSITION COMPRISING THE SAME

This application is a National Stage Entry of International Application No. PCT/KR2013/007444, filed Aug. 20, 2013, and claims the benefit of Korean Application No. 10-2012-0091228 filed on Aug. 21, 2012, all of which are hereby incorporated by reference in their entirety for all purposes as if fully set forth herein.

TECHNICAL FIELD

The present invention relates to an additive for cement compositions that includes a polycarboxylic copolymer and a cement composition including the same and, more particularly, to an additive for cement compositions that includes a polycarboxylic copolymer and/or a salt thereof, wherein the polycarboxylic copolymer is a copolymer of a monomer mixture including an alkoxy polyalkylene glycol mono(meth)acrylic acid ester-based monomer, a (meth)acrylic acid-based monomer, a (meth)acrylic acid ester-based monomer, and a polyoxyalkylene alkenyl ether sulfate salt and a cement composition including the same.

BACKGROUND ART

Cement compositions, such as cement pastes prepared by mixing cement, water, and other additives, mortar prepared by adding sand to the cement paste, and concrete prepared by further adding large aggregates such as gravel to the mortar and mixing the resulting mortar, are used in large amounts in a variety of construction materials and the like. However, the prepared cement composition starts to harden over time due to hydration reaction between cement and water and thus workability thereof is gradually deteriorated. In this case, water is additionally added to enhance workability and, consequently, compression strength is reduced and cracks in the cement composition occur and thus a total amount of water used in a cement composition is limited. Thus, a variety of cement additives for reducing the amount of water and maintaining dispersibility of a cement composition have been developed.

In particular, among such cement compositions, concrete requires completion of all tasks, ranging from concrete mixing to concrete pouring, within a short period of time because slump reduction generally occurs after 30 minutes. Recently, there has been a need to develop a cement additive that meets demand for increasing unit number according to reduction in quality of concrete aggregates, has higher water-reducing performance than conventional plasticizers due to use of modern mechanized equipment and traffic congestion, or has excellent slump retaining performance.

To increase fluidity of cement compositions, various kinds of cement dispersants are currently used. However, in general, when a hydraulic composition with high water reduction performance is prepared using a cement dispersant, slump loss is significant and workability and constructability are deteriorated. Thus, to prevent slump loss, efforts to use a water-soluble polycarboxylic copolymer with slump loss prevention performance as a cement dispersant are conventionally made. Examples of the water-soluble polycarboxylic copolymer include, but are not limited to, water-soluble vinyl copolymers prepared through copolymerization of methacrylates (disclosed in Japanese Patent Application Laid-open No. Hei 1-226757, U.S. Pat. No. 4,962,173, and Japanese Patent Application Laid-open No. Hei 4-209613) and copolymers of maleic anhydride and alkenyl ether or derivatives thereof (disclosed in Japanese Patent Application Announcement No. Sho 58-38380, Japanese Patent Application Laid-open No. Sho 63-285140, and Japanese Patent Application Laid-open No. Hei 2-163108). However, in conventional methods of using the water-soluble copolymer as a cement dispersant, slump loss is insufficiently prevented.

In addition, to prevent such slump loss, use of a fluidity reduction inhibitor and a cement dispersant in combination has been proposed. As an example, a method of obtaining slump loss prevention using a non-water-soluble copolymer obtained from maleic anhydride and olefin and a cement dispersant in combination and using characteristics in which the non-water-soluble copolymer is hydrolyzed by a basic hydroxide produced by hydration of cement to slowly become a water-soluble copolymer is proposed (Japanese Patent Application Announcement No. Hei 5-67579). However, in the conventional method of using a fluidity reduction inhibitor and a cement dispersant in combination, slump loss prevention performance is changed and deteriorated over time and condensation delay is large.

Meanwhile, Japanese Patent Application Laid-open No. Hei 7-267705 discloses a cement dispersant including three kinds of polymer. The three kinds of polymer include a copolymer (a first component) of a polyalkylene glycol mono (meth)acrylate compound and a (meth)acrylic acid compound, a copolymer (a second component) of a polyalkylene glycol mono(meth)allyl ether compound and maleic anhydride, and a copolymer (a third component) of a polyalkylene glycol mono(meth)allyl ether compound and a maleic acid-esterified polyalkylene glycol compound. The cited patent specification describes that, when used alone, the first component increases the initial fluidity of cement but is poor in slump-retaining ability and increases the viscosity of the cement composition. In addition, the cited patent specification describes that, when used alone, the second component requires time to increase initial fluidity and, even when the initial fluidity is increased by increasing the amount thereof, it causes phase separation of the cement composition over time. In addition, the cited patent specification describes that, when used alone, the third component is further poor in dispersibility of the cement composition and that, therefore, such effects that cannot be obtained by use of each of the three components alone are produced by using the three components in combination in a particular mix ratio. Thus, it is presumed in the cited specification that differences in action mechanisms among the three components in the cement composition are due to molecular weight of each component and differences in initial fluidity increasing effects are due to a faster adsorption rate on cement particles of a (meth)acrylic acid-based functional group-containing polymer than a maleic acid-based functional group-containing polymer, whereby the latter exhibits higher initial fluidity. In addition, it is further described that a component higher in rate of adsorption is poor in the ability to retain fluidity.

At present, a technique is known in the art which includes use of a polyalkylene glycol mono(meth)acrylate/(meth) acrylic acid copolymer and an unsaturated polyalkylene glycol monoalkenyl ether/maleic acid copolymer in combination. However, cement compositions having both sufficient initial dispersibility and slump retaining ability have not yet been disclosed and addition of a dispersant in a large amount is needed to exhibit sufficient initial dispersibility. In particular, it is further difficult to select an additive that imparts sufficient dispersibility and dispersion retaining ability to cement in a high water reducing ratio range.

Therefore, there is an urgent need to develop technology for fundamentally addressing these problems.

DISCLOSURE

Technical Problem

The present invention aims to address the aforementioned problems of the related art and to achieve technical goals that have long been sought.

As a result of a variety of extensive and intensive studies and experiments, the inventors of the present invention developed a polycarboxylic copolymer that has excellent water reducing performance, thus imparting initial dispersibility without adding a separate water reducing agent or slump retaining agent and that may provide slump loss prevention, i.e., slump retaining ability and confirmed that, when the polycarboxylic copolymer is used as an additive for a cement composition, reduction in fluidity of a cement composition is prevented, thus completing the present invention.

It is another object of the present invention to provide a method of preventing reduction in fluidity of a cement composition.

The above and other objects of the present invention may be achieved by embodiments of the present invention described below.

Technical Solution

In accordance with one aspect of the present invention, provided is an additive for cement compositions that includes a polycarboxylic copolymer and/or a salt thereof, wherein the polycarboxylic copolymer is a copolymer of a monomer mixture including an alkoxy polyalkylene glycol mono(meth)acrylic acid ester-based monomer, a (meth)acrylic acid-based monomer, a (meth)acrylic acid ester-based monomer, and a polyoxyalkylene alkenyl ether sulfate salt.

That is, according to the present invention, a copolymer based on polycarboxylic monomers, prepared by combining a (meth)acrylic acid-based monomer and a functional acrylic acid ester-based monomer to an alkoxy polyalkylene glycol mono(meth)acrylic acid ester-based macromonomer and copolymerizing the monomers, is used as a cement additive and thus provides excellent dispersibility as compared to conventional cement additives. In addition, the polycarboxylic monomer-based copolymer may increase fluidity of a cement composition even in a high water reducing ratio range, significantly prevent reduction over time in the obtained fluidity for a long period of time, and impart good workability to the cement composition by continuously entraining an appropriate amount of air.

The polycarboxylic copolymer may be added as it is and used as a main component of a cement composition. As desired, a copolymer salt obtained by neutralization with an alkaline material may be added to the polycarboxylic copolymer and the resultant material may be used as a main component of a cement composition.

In a specific embodiment, the alkaline material may be at least one selected from the group consisting of hydroxides, chlorides and carbonates of monovalent or divalent metals, ammonia, and organic amines.

In a specific embodiment, the polycarboxylic copolymer may be a copolymer of a monomer mixture including 50 to 97.5 wt % of an alkoxy polyalkylene glycol mono(meth)acrylic acid ester-based monomer, 1 to 48.5 wt % of a (meth)acrylic acid-based monomer, 1 to 48.5 wt % of a (meth)acrylic acid ester-based monomer, and 0.5 to 48 wt % of a polyoxyalkylene alkenyl ether sulfate salt.

When copolymerizing the monomers within the above-described amount ranges, the obtained polycarboxylic copolymer may exhibit excellent dispersibility, slump retaining ability and initial dispersibility and also have excellent air-entraining ability.

In a specific embodiment, the alkoxy polyalkylene glycol mono(meth)acrylic acid ester-based monomer may be represented by Formula 1 below:

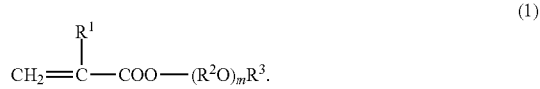

$$CH_2=\overset{R^1}{\underset{|}{C}}-COO-(R^2O)_m R^3. \qquad (1)$$

In Formula 1, $R^1$ is a hydrogen atom or methyl, $R^2O$ is $C_2$-$C_4$ oxyalkylene or a mixture of at least two kinds thereof, in which the mixture of at least two kinds thereof may be present in a block or random form, $R^3$ is $C_1$-$C_4$ alkyl, and m denotes an average addition mole number of the oxyalkylene group and is an integer of 50 to 200.

When the average addition mole number of the oxyalkylene group is 50 to 200, excellent dispersibility and slump retaining ability may be obtained. In particular, the average addition mole number of the oxyalkylene group may be 50 to 150.

The alkoxy polyalkylene glycol mono(meth)acrylic acid ester-based monomer of Formula 1 may, for example, be at least one monomer selected from the group consisting of methoxy polyethylene glycol mono(meth)acrylate, methoxy polypropylene glycol mono(meth)acrylate, methoxy polybutylene glycol mono(meth)acrylate, methoxy polyethylene glycol polypropylene glycol mono(meth)acrylate, methoxy polyethylene glycol polybutylene glycol mono(meth)acrylate, methoxy polypropylene glycol polybutylene glycol mono(meth)acrylate, methoxy polyethylene glycol polypropylene glycol polybutylene glycol mono(meth)acrylate, ethoxy polyethylene glycol mono(meth)acrylate, ethoxy polypropylene glycol mono(meth)acrylate, ethoxy polybutylene glycol mono(meth)acrylate, ethoxy polyethylene glycol polypropylene glycol mono(meth)acrylate, ethoxy polyethylene glycol polybutylene glycol mono(meth)acrylate, ethoxy polypropylene glycol polybutylene glycol mono (meth)acrylate, and ethoxy polyethylene glycol polypropylene glycol polybutylene glycol mono(meth)acrylate.

In a specific embodiment, the (meth)acrylic acid-based monomer may be represented by Formula 2 below:

$$R^2-COOM^1 \qquad (2)$$

In Formula 2 above, $R^2$ is a $C_2$-$C_5$ hydrocarbon group containing an unsaturated bond, and $M^1$ is a hydrogen atom, a monovalent or divalent metal, an ammonium group, or an organic amine salt.

The (meth)acrylic acid-based monomer of Formula 2 may, for example, be at least one monomer selected from the group consisting of acrylic acid, methacrylic acid, and monovalent or divalent metal salts, ammonium salts and organic amine salts of these acids.

In a specific embodiment, the (meth)acrylic acid ester-based monomer may be represented by Formula 3 below:

$$R^3-COO-R^4-OM^2 \qquad (3)$$

In Formula 3 above, $R^3$ is a $C_2$-$C_5$ hydrocarbon group containing an unsaturated bond, $R^4$ is a $C_1$-$C_6$ hydrocarbon group, and $M^2$ is a hydrogen atom, a monovalent or divalent metal, an ammonium group, or an organic amine salt.

The (meth)acrylic acid ester-based monomer of Formula 3 may, for example, be at least one monomer selected from the group consisting of 2-hydroxyethyl methacrylate, hydroxypropyl methacrylate, hydroxyethyl acrylate, hydroxypropyl acrylate, and monovalent or divalent metal salts, ammonium salts and organic amine salts thereof.

In a specific embodiment, the polyoxyalkylene alkenyl ether sulfate salt may be represented by Formula 4 below:

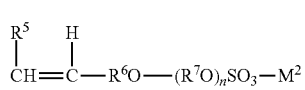

(4)

In Formula 4 above, $R^5$ is a hydrogen atom or methyl, $R^6$ is $C_1$-$C_3$ alkylene, phenylene or alkylphenylene, $R^7$ is $C_1$-$C_4$ oxyalkylene or a mixture of at least two kinds thereof, wherein the mixture of at least two kinds thereof may be present in a block or random form, n denotes an average addition mole number of the oxyalkylene group and is an integer of 10 to 50, and $M^2$ is a hydrogen atom, a monovalent metal, ammonium, or organic amine.

The polyoxyalkylene alkenyl ether sulfate salt is a reactive surfactant included as a unit monomer in a carboxylic copolymer and has both a hydrophobic group and a hydrophilic group, thus increasing polymer solubility. In addition, the polyoxyalkylene alkenyl ether sulfate salt increases properties that enables a polymer to be physically adsorbed onto cement particles and thus assists in maintaining dispersibility of the cement particles and, accordingly, reduction over time in fluidity of a cement composition, caused when the mole number of alkylene oxide groups added to a polyalkylene glycol ester-based monomer is increased, is suppressed, thus maintaining the slump retaining ability.

In addition, the polyoxyalkylene alkenyl ether sulfate salt has a double bond capable of participating in radical reaction and thus acts as a surfactant in a polymer main chain through copolymerization with monomers. A hydrophobic portion of such a surfactant assists in adsorption onto cement particles and an ionic portion thereof forms an electric double layer to increase zeta potential and increases electrostatic repulsion between dispersed particles and stability. Thus, hydrophilicity of polyalkylene glycol chains, cement dispersing effects by steric repulsion, electrostatic repulsion caused by sulfonic acid at the terminal of the surfactant are simultaneously obtained and thus dispersibility and stability of entrained air are excellent.

The polyoxyalkylene alkenyl ether sulfate salt monomer of Formula 4 may, for example, be at least one monomer selected from the group consisting of: sulfoxypolyalkylene glycol allyl ethers, such as sulfoxypolyethylene glycol nonylphenylpropenyl ether, sulfoxypolyethylene glycol allyl ether, sulfoxypolypropylene glycol allyl ether, sulfoxypolybutylene glycol allyl ether, sulfoxypolyethylene glycol 2-butenyl ether, sulfoxypolypropylene glycol 2-butenyl ether, sulfoxypolybutylene glycol 2-butenyl ether, sulfoxypolyethylene glycol 3-butenyl ether, sulfoxypolypropylene glycol 3-butenyl ether, sulfoxypolybutylene glycol 3-butenyl ether, sulfoxypolyethylene glycol 3-pentenyl ether, sulfoxypolypropylene glycol 3-pentenyl ether, and sulfoxypolybutylene glycol 3-pentenyl ether; sulfoxypolyalkylene glycol alkylvinylphenyl ethers, such as sulfoxypolyethylene glycol (3-vinyl-5-methyl)phenyl ether, sulfoxypolypropylene glycol (3-vinyl-5-methyl)phenyl ether, sulfoxypolybutylene glycol (3-vinyl-5-methyl)phenyl ether, sulfoxypolyethylene glycol (3-vinyl-5-ethyl)phenyl ether, sulfoxypolypropylene glycol (3-vinyl-5-ethyl)phenyl ether, sulfoxypolybutylene glycol (3-vinyl-5-ethyl)phenyl ether, sulfoxypolyethylene glycol (3-propenyl-5-propyl)phenyl ether, sulfoxypolypropylene glycol (3-propenyl-5-propyl)phenyl ether, sulfoxypolybutylene glycol (3-propenyl-5-propyl)phenyl ether, sulfoxypolyethylene glycol (3-propenyl-5-butyl)phenyl ether, sulfoxypolypropylene glycol (3-propenyl-5-butyl)phenyl ether, and sulfoxypolybutylene glycol (3-propenyl-5-butyl)phenyl ether; 2-sulfoxypolyalkylene glycol-3-(4-alkylphenoxyl) propylene allyl ethers, such as 2-sulfoxypolyethylene glycol-3-(4-methylphenoxyl)propylene allyl ether, 2-sulfoxypolypropylene glycol-3-(4-methylphenoxyl)propylene allyl ether, 2-sulfoxypolybutylene glycol-3-(4-methylphenoxyl) propylene allyl ether, 2-sulfoxypolyethylene glycol-3-(4-ethylphenoxyl)propylene allyl ether, 2-sulfoxypolypropylene glycol-3-(4-ethylphenoxyl)propylene allyl ether, and 2-sulfoxypolybutylene glycol-3-(4-ethylphenoxyl)propylene allyl ether; and monomers obtained by neutralizing the above-listed compounds with a monovalent metal, a divalent metal, an ammonium salt, or an organic amine.

The alkoxypolyalkylene glycol mono(meth)acrylic acid ester-based monomer and the polyoxyalkylene alkenyl ether sulfate salt have a double bond capable of participating in radical reaction and thus may induce electrostatic repulsion between dispersed particles and stability through copolymerization with monomers and, accordingly, slump fluidity is maintained for a long period of time and thus changes over time in a cement composition are minimized.

The polycarboxylic copolymer may be prepared by copolymerizing the monomer components using a polymerization initiator, and the copolymerization process may be performed using a method such as solution polymerization, mass polymerization, or the like, but embodiments of the present invention are not limited thereto.

For example, when solution polymerization is performed using water as a solvent, a water-soluble polymerization initiator such as a persulfate of ammonium or an alkali metal, hydrogen peroxide, or the like may be used as a solution polymerization initiator. In polymerization using, as a solvent, a lower alcohol, an aromatic hydrocarbon, an aliphatic hydrocarbon, an ester compound, or a ketone compound, hydroperoxides such as benzoyl peroxide, lauroyl peroxide, and cumene hydroperoxide, or aromatic azo compounds such as azobisisobutyronitrile and the like may be used as a polymerization initiator. In this regard, an accelerator such as an amine compound or the like may be used in combination therewith. In addition, when a mixed solvent of water and lower alcohol is used, the above polymerization initiators or combinations of polymerization initiators and accelerators may be appropriately used.

A suitable amount of the polymerization initiator may be, in particular, 0.5 wt % to 5 wt % based on a total weight of the monomer mixture. Polymerization temperature may be, in particular, in the range of 0° C. to 120° C. according to kind of a solvent or polymerization initiator used.

In addition, a thiol-based chain transfer agent may be used to adjust molecular weight of the obtained polycarboxylic copolymer. The thiol-based chain transfer agent may be at least one material selected from the group consisting of mercaptoethanol, thioglycerol, thioglycollic acid, 2-mercaptopropionic acid, 3-mercaptopropionic acid, thiomalic acid, thioglycollic acid octyl, and 3-mercaptopropionic acid octyl. The amount of the thiol-based chain transfer agent may be 0.01 wt % to 5 wt % based on the total weight of the monomer mixture.

In a specific embodiment, the polycarboxylic copolymer and a copolymer salt obtained by neutralizing the polycarboxylic copolymer may have a weight average molecular weight of, in particular, 30,000 to 70,000, more particularly 40,000 to 60,000, when measured by gel permeation chromatography (GPC), considering dispersibility.

The present invention also provides a cement composition including at least one additive selected from the group consisting of a polycarboxylic copolymer, which is a copolymer of a monomer mixture including an alkoxy polyalkylene glycol mono(meth)acrylic acid ester-based monomer, a (meth) acrylic acid-based monomer, a (meth)acrylic acid ester-based monomer, and a polyoxyalkylene alkenyl ether sulfate salt, and a copolymer salt obtained by neutralizing the polycarboxylic copolymer using an alkaline material.

In a specific embodiment, the amount of the additive in the cement composition may be 0.01 to 10 parts by weight, in particular 0.05 to 5 parts by weight, more particularly 0.1 to 5 parts by weight, based on 100 parts by weight of cement. When the amount of the additive in the cement composition is within the above-described range, excellent fluidity may be provided even in a high water reducing ratio range. That is, when the amount of the additive exceeds 10 parts by weight, addition effects are not obtained and thus it is not desirable in terms of economic efficiency. On the other hand, when the amount of the additive is less than 0.05 parts by weight, in particular 0.01 parts by weight, it is difficult to exhibit desired performance such as slump retaining ability, water reducing performance, air entraining ability, and the like.

The cement composition includes all cement compositions known in the art, including cement pastes prepared by adding water to cement, mortar prepared by adding fine aggregates such as sand to a cement paste, and concrete prepared by further adding large aggregates such as gravel to mortar and mixing them.

The present invention also provides a method of preventing reduction in fluidity of the cement composition, including: preparing the cement composition by adding at least one additive selected from the group consisting of a polycarboxylic copolymer, which is a copolymer of a monomer mixture including an alkoxy polyalkylene glycol mono(meth)acrylic acid ester-based monomer, a (meth)acrylic acid-based monomer, a (meth)acrylic acid ester-based monomer, and a polyoxyalkylene alkenyl ether sulfate salt, and a copolymer salt obtained by neutralizing the polycarboxylic copolymer using an alkaline material; and continuously entraining air into the cement composition.

In this regard, a suitable amount of continuously entrained air is not particularly limited. However, in the case of fresh concrete, the suitable amount may be, in particular, 1 to 9%, more particularly 3 to 5%.

MODE FOR INVENTION

Now, the present invention will be described in more detail with reference to the accompanying drawings and the following examples. These examples are only provided for illustration of the present invention and should not be construed as limiting the scope and spirit of the present invention.

Example 1

150 parts by weight of water was added to a 2 L glass reactor equipped with a thermometer, a stirrer, a dropping funnel, a nitrogen feed tube, and a reflux cooler, nitrogen is fed into the reactor while stirring, and the reactor was heated to 80° C. under the nitrogen atmosphere.

Subsequently, 20 parts by weight of a 3 wt % aqueous ammonium persulfate solution was added to the reactor and the resulting solution was completely dissolved. Thereafter, an aqueous monomer solution as a polymerization composition prepared by mixing 300 parts by weight of methoxypolyethylene glycol monomethacrylate (average addition mole number of ethylene oxide: 50 moles), 35 parts by weight of acrylic acid, 17.5 parts by weight of hydroxyethylacrylate, 1.0 part by weight of a polyoxyethylene nonylphenylpropenyl ether sulfate ammonium salt as a non-ionic and anionic reactive surfactant (average addition mole number of ethylene oxide: 10 moles), and 50 parts by weight of water, a mixed solution of 2.5 parts by weight of 2-mercaptoethanol and 30 parts by weight of water, and 70 parts by weight of a 3 wt % aqueous ammonium persulfate solution were added dropwise to the reactor over 4 hours. Then, 10 parts by weight of a 3 wt % aqueous ammonium persulfate solution was added again thereto at once. Thereafter, reaction continued for 1 hour and the temperature of the reactor was maintained at 80° C., thereby completing polymerization.

After polymerization was completed, the obtained polymer was cooled to room temperature and neutralized with a 30 wt % aqueous sodium hydroxide solution for about 1 hour to prepare 50% of solids. The weight average molecular weight of the prepared water-soluble copolymer salt was 45,000, when measured by gel permeation chromatography (GPC).

Example 2

Polymerization was completed in the same manner as in Example 1, except that an aqueous monomer solution prepared by mixing 300 parts by weight of methoxypolyethylene glycol monomethacrylate (average addition mole number of ethylene oxide: 50 moles), 39 parts by weight of methacrylic acid, 14 parts by weight of hydroxyethylmethacrylate, 1.0 part by weight of a polyoxyethylene nonylphenylpropenyl ether sulfate ammonium salt as a non-ionic and anionic reactive surfactant (average addition mole number of ethylene oxide: 10 moles), and 50 parts by weight of water was used as the polymerization composition.

After polymerization was completed, the obtained polymer was cooled to room temperature and neutralized with a 30 wt % aqueous sodium hydroxide solution for about 1 hour to prepare 50% of solids. The weight average molecular weight of the prepared water-soluble copolymer salt was 47,000, when measured by GPC.

Example 3

Polymerization was completed in the same manner as in Example 1, except that an aqueous monomer solution prepared by mixing 310 parts by weight of methoxypolyethylene glycol monomethacrylate (average addition mole number of ethylene oxide: 50 moles), 35 parts by weight of acrylic acid, 7 parts by weight of hydroxyethylmethacrylate, 1.0 part by weight of a polyoxyethylene nonylphenylpropenyl ether sulfate ammonium salt as a non-ionic and anionic reactive surfactant (average addition mole number of ethylene oxide: 10 moles), and 50 parts by weight of water was used as the polymerization composition.

After polymerization was completed, the obtained polymer was cooled to room temperature and neutralized with a 30 wt % aqueous sodium hydroxide solution for about 1 hour to prepare 50% of solids. The weight average molecular weight of the prepared water-soluble copolymer salt was 46,000, when measured by GPC.

Example 4

Polymerization was completed in the same manner as in Example 1, except that an aqueous monomer solution prepared by mixing 310 parts by weight of methoxypolyethylene glycol monomethacrylate (average addition mole number of ethylene oxide: 50 moles), 39 parts by weight of methacrylic acid, 3.5 parts by weight of hydroxyethylacrylate, 1.0 part by weight of a polyoxyethylene nonylphenylpropenyl ether sulfate ammonium salt as a non-ionic and anionic reactive surfactant (average addition mole number of ethylene oxide: 10 moles), and 50 parts by weight of water was used as the polymerization composition.

After polymerization was completed, the obtained polymer was cooled to room temperature and neutralized with a 30 wt % aqueous sodium hydroxide solution for about 1 hour to prepare 50% of solids. The weight average molecular weight of the prepared water-soluble copolymer salt was 46,000, when measured by GPC.

Example 5

Polymerization was completed in the same manner as in Example 1, except that an aqueous monomer solution prepared by mixing 300 parts by weight of methoxypolyethylene glycol monomethacrylate (average addition mole number of ethylene oxide: 100 moles), 35 parts by weight of acrylic acid, 17.5 parts by weight of hydroxyethylacrylate, 1.0 part by weight of a polyoxyethylene nonylphenylpropenyl ether sulfate ammonium salt as a non-ionic and anionic reactive surfactant (average addition mole number of ethylene oxide: 10 moles), and 50 parts by weight of water was used as the polymerization composition.

After polymerization was completed, the obtained polymer was cooled to room temperature and neutralized with a 30 wt % aqueous sodium hydroxide solution for about 1 hour to prepare 50% of solids. The weight average molecular weight of the prepared water-soluble copolymer salt was 48,000, when measured by GPC.

Example 6

Polymerization was completed in the same manner as in Example 1, except that an aqueous monomer solution prepared by mixing 300 parts by weight of methoxypolyethylene glycol monomethacrylate (average addition mole number of ethylene oxide: 100 moles), 39 parts by weight of methacrylic acid, 14 parts by weight of hydroxyethylmethacrylate, 1.0 part by weight of a polyoxyethylene nonylphenylpropenyl ether sulfate ammonium salt as a non-ionic and anionic reactive surfactant (average addition mole number of ethylene oxide: 10 moles), and 50 parts by weight of water was used as the polymerization composition.

After polymerization was completed, the obtained polymer was cooled to room temperature and neutralized with a 30 wt % aqueous sodium hydroxide solution for about 1 hour to prepare 50% of solids. The weight average molecular weight of the prepared water-soluble copolymer salt was 45,000, when measured by GPC.

Example 7

Polymerization was completed in the same manner as in Example 1, except that an aqueous monomer solution prepared by mixing 310 parts by weight of methoxypolyethylene glycol monomethacrylate (average addition mole number of ethylene oxide: 100 moles), 35 parts by weight of acrylic acid, 7 parts by weight of hydroxyethylmethacrylate, 1.0 part by weight of a polyoxyethylene nonylphenylpropenyl ether sulfate ammonium salt as a non-ionic and anionic reactive surfactant (average addition mole number of ethylene oxide: 10 moles), and 50 parts by weight of water was used as the polymerization composition.

After polymerization was completed, the obtained polymer was cooled to room temperature and neutralized with a 30 wt % aqueous sodium hydroxide solution for about 1 hour to prepare 50% of solids. The weight average molecular weight of the prepared water-soluble copolymer salt was 47,000, when measured by GPC.

Example 8

Polymerization was completed in the same manner as in Example 1, except that an aqueous monomer solution prepared by mixing 310 parts by weight of methoxypolyethylene glycol monomethacrylate (average addition mole number of ethylene oxide: 100 moles), 39 parts by weight of methacrylic acid, 3.5 parts by weight of hydroxyethylacrylate, 1.0 part by weight of a polyoxyethylene nonylphenylpropenyl ether sulfate ammonium salt as a non-ionic and anionic reactive surfactant (average addition mole number of ethylene oxide: 10 moles), and 50 parts by weight of water was used as the polymerization composition.

After polymerization was completed, the obtained polymer was cooled to room temperature and neutralized with a 30 wt % aqueous sodium hydroxide solution for about 1 hour to prepare 50% of solids. The weight average molecular weight of the prepared water-soluble copolymer salt was 48,000, when measured by GPC.

Comparative Example 1

150 parts by weight of water was added to a 2 L glass reactor equipped with a thermometer, a stirrer, a dropping funnel, a nitrogen feed tube, and a reflux cooler, nitrogen is fed into the reactor while stirring, and the reactor was heated to 80° C. under the nitrogen atmosphere.

Subsequently, 20 parts by weight of a 3 wt % aqueous ammonium persulfate solution was added to the reactor and the resulting solution was completely dissolved. Thereafter, an aqueous monomer solution as a polymerization composition prepared by mixing 300 parts by weight of methoxypolyethylene glycol monomethacrylate (average addition mole number of ethylene oxide: 23 moles), 35 parts by weight of acrylic acid, 17.5 parts by weight of hydroxyethylacrylate, 1.0 part by weight of a polyoxyethylene nonylphenylpropenyl ether sulfate ammonium salt as a non-ionic and anionic reactive surfactant (average addition mole number of ethylene oxide: 10 moles), and 50 parts by weight of water, a mixed solution of 2.5 parts by weight of 2-mercaptoethanol and 30 parts by weight of water, and 70 parts by weight of a 3 wt % aqueous ammonium persulfate solution were added dropwise to the reactor over 4 hours. Then, 10 parts by weight of a 3 wt % aqueous ammonium persulfate solution was added again thereto at once. Thereafter, reaction continued for 1 hour and the temperature of the reactor was maintained at 80° C., thereby completing polymerization.

After polymerization was completed, the obtained polymer was cooled to room temperature and neutralized with a 30 wt % aqueous sodium hydroxide solution for about 1 hour to prepare 50% of solids. The weight average molecular weight of the prepared water-soluble copolymer salt was 46,000, when measured by GPC.

Comparative Example 2

Polymerization was completed in the same manner as in Comparative Example 1, except that an aqueous monomer solution prepared by mixing 310 parts by weight of methoxypolyethylene glycol monomethacrylate (average addition mole number of ethylene oxide: 23 moles), 39 parts by weight of methacrylic acid, 3.5 parts by weight of hydroxyethylmethacrylate, 1.0 part by weight of a polyoxyethylene nonylphenylpropenyl ether sulfate ammonium salt as a non-ionic and anionic reactive surfactant (average addition mole number of ethylene oxide: 10 moles), and 50 parts by weight of water was used as the polymerization composition.

After polymerization was completed, the obtained polymer was cooled to room temperature and neutralized with a 30 wt % aqueous sodium hydroxide solution for about 1 hour to prepare 50% of solids. The weight average molecular weight of the prepared water-soluble copolymer salt was 45,000, when measured by GPC.

Comparative Example 3

Polymerization was completed in the same manner as in Comparative Example 1, except that an aqueous monomer solution prepared by mixing 320 parts by weight of methoxypolyethylene glycol monomethacrylate (average addition mole number of ethylene oxide: 23 moles), 53 parts by weight of acrylic acid, 1.0 part by weight of a polyoxyethylene nonylphenylpropenyl ether sulfate ammonium salt as a non-ionic and anionic reactive surfactant (average addition mole number of ethylene oxide: 10 moles), and 50 parts by weight of water was used as the polymerization composition.

After polymerization was completed, the obtained polymer was cooled to room temperature and neutralized with a 30 wt % aqueous sodium hydroxide solution for about 1 hour to prepare 50% of solids. The weight average molecular weight of the prepared water-soluble copolymer salt was 48,000, when measured by GPC.

Comparative Example 4

Polymerization was completed in the same manner as in Comparative Example 1, except that an aqueous monomer solution prepared by mixing 320 parts by weight of methoxypolyethylene glycol monomethacrylate (average addition mole number of ethylene oxide: 50 moles), 53 parts by weight of acrylic acid, 1.0 part by weight of a polyoxyethylene nonylphenylpropenyl ether sulfate ammonium salt as a non-ionic and anionic reactive surfactant (average addition mole number of ethylene oxide: 10 moles), and 50 parts by weight of water was used as the polymerization composition.

After polymerization was completed, the obtained polymer was cooled to room temperature and neutralized with a 30 wt % aqueous sodium hydroxide solution for about 1 hour to prepare 50% of solids. The weight average molecular weight of the prepared water-soluble copolymer salt was 47,000, when measured by GPC.

Comparative Example 5

Polymerization was completed in the same manner as in Comparative Example 1, except that an aqueous monomer solution prepared by mixing 320 parts by weight of methoxypolyethylene glycol monomethacrylate (average addition mole number of in ethylene oxide: 100 moles), 53 parts by weight of acrylic acid, 1.0 part by weight of a polyoxyethylene nonylphenylpropenyl ether sulfate ammonium salt as a non-ionic and anionic reactive surfactant (average addition mole number of ethylene oxide: 10 moles), and 50 parts by weight of water was used as the polymerization composition.

After polymerization was completed, the obtained polymer was cooled to room temperature and neutralized with a 30 wt % aqueous sodium hydroxide solution for about 1 hour to prepare 50% of solids. The weight average molecular weight of the prepared water-soluble copolymer salt was 46,000, when measured by GPC.

Amounts of main components of the polycarboxylic copolymer salts prepared according to Examples 1 to 8 and Comparative Examples 1 to 5 and properties thereof are shown in Table 1 below.

TABLE 1

| Classification | Polyalkylene glycol (meth)acrylate | | (meth)acrylic acid-based monomer Amount in copolymer (wt %) | (meth)acrylic acid ester-based monomer Amount in copolymer (wt %) | Reactive surfactant Amount in copolymer (wt %) | Weight average molecular weight |
|---|---|---|---|---|---|---|
| | Mole number of EO | Wt % | | | | |
| Example 1 | 50 | 300 | 35 | 17.5 | 1.0 | 45,000 |
| Example 2 | 50 | 300 | 39 | 14 | 1.0 | 47,000 |
| Example 3 | 50 | 310 | 35 | 7 | 1.0 | 46,000 |
| Example 4 | 50 | 310 | 39 | 3.5 | 1.0 | 46,000 |
| Example 5 | 100 | 300 | 35 | 17.5 | 1.0 | 48,000 |
| Example 6 | 100 | 300 | 39 | 14 | 1.0 | 45,000 |
| Example 7 | 100 | 310 | 35 | 7 | 1.0 | 47,000 |
| Example 8 | 100 | 310 | 39 | 3.5 | 1.0 | 48,000 |
| Comparative Example 1 | 23 | 300 | 35 | 17.5 | 1.0 | 46,000 |
| Comparative Example 2 | 23 | 310 | 39 | 3.5 | 1.0 | 45,000 |
| Comparative Example 3 | 23 | 320 | 53 | | 1.0 | 48,000 |
| Comparative Example 4 | 50 | 320 | 53 | | 1.0 | 47,000 |
| Comparative Example 5 | 100 | 320 | 53 | | 1.0 | 46,000 |

Experimental Example 1

Mortar Fluidity Test 500 g of Portland cement (SsangYong Cement), 800 g of sand, 1.0 g (solid content) of each of the prepared polycarboxylic copolymers, and 180 g of water (tap water) were mixed at medium speed in a mortar mixer for 3 minutes to prepare mortar. Each prepared mortar was filled in a hollow cone having a diameter of 60 mm and a height of 40 mm and then the cone was lifted in a vertical direction. A flow value (mm) of the mortar was determined by measuring diameters in two directions of the mortar and obtaining an average value thereof.

Experimental Example 2

Concrete Test 680 kg of Portland cement (SsangYong Cement), 1700 kg of sand, 1850 kg of rubble, 0.2 wt % (based on the weight of cement) of each polycarboxylic copolymer, and 370 kg of water (tap water) were mixed to prepare concrete. Slump and air content of each prepared concrete were measured in accordance with Korean Industrial Standards KS F 2402 and KS F 2449.

Results of Experimental Examples 1 and 2 of the cement concretes prepared using these water-soluble copolymer salts are shown in Table 2 below.

TABLE 2

| Classification | Addition amount/ Cement (wt %) | Flow value (mm) of mortar | | Slump (cm) | | Air content (%) | |
|---|---|---|---|---|---|---|---|
| | | Initial | After 60 minutes | Initial | After 90 minutes | Initial | After 90 minutes |
| Example 1 | 0.2 | 124 | 150 | 20.5 | 23 | 4.5 | 4 |
| Example 2 | 0.2 | 126 | 145 | 20.5 | 22 | 4 | 3.5 |
| Example 3 | 0.2 | 127 | 144 | 20 | 21.5 | 4 | 4 |
| Example 4 | 0.2 | 123 | 147 | 20 | 22.5 | 4 | 4 |
| Example 5 | 0.2 | 123 | 150 | 20.5 | 22.5 | 4.5 | 4 |
| Example 6 | 0.2 | 121 | 143 | 19.5 | 21.5 | 4 | 4 |
| Example 7 | 0.2 | 123 | 144 | 20.5 | 22 | 4 | 4 |
| Example 8 | 0.2 | 121 | 147 | 20 | 22 | 4 | 4 |
| Comparative Example 1 | 0.2 | 145 | 132 | 21 | 19.5 | 5 | 5 |
| Comparative Example 2 | 0.2 | 140 | 128 | 20.5 | 19 | 5 | 5 |
| Comparative Example 3 | 0.2 | 147 | 126 | 21 | 18 | 5 | 5 |
| Comparative Example 4 | 0.2 | 139 | 130 | 20 | 19 | 4.5 | 4.5 |
| Comparative Example 5 | 0.2 | 140 | 133 | 20.5 | 19.5 | 4.5 | 4.5 |

As shown in Table 2 above, the mortar prepared using each of the polycarboxylic copolymers of Examples 1 to 8 has a smaller initial value while exhibiting higher mortar flow value after 60 minutes, which means high fluidity retaining ability, as compared to the mortar prepared using each of the polycarboxylic copolymers of Comparative Examples 1 to 5. Even in the concrete test, the concrete prepared using the mortar prepared using each of the polycarboxylic copolymers of Examples 1 to 8 has a higher slump value after 90 minutes and a larger air content than the concrete prepared using the mortar prepared using each of the polycarboxylic copolymers of Comparative Examples 1 to 5. That is, from the results shown in Table 2 above, it can be confirmed that the polycarboxylic copolymer according to the present invention enhances dispersibility of cement particles and, even when used in a small amount, exhibits high fluidity retaining ability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, according to the present invention, a polycarboxylic copolymer prepared through polymerization by adding a polyoxyalkylene alkenyl ether sulfate salt unit monomer as a reactive surfactant, an alkoxypolyalkylene glycol mono(meth)acrylic acid ester-based monomer, a (meth)acrylic acid-based monomer, and a (meth)acrylic acid ester-based monomer and/or a salt of the polycarboxylic copolymer is added to a cement composition, whereby fluidity of the cement composition is enhanced even in a high water reducing ratio range and deterioration of the cement composition over time is prevented.

In addition, according to the present invention, an appropriate amount of air is continuously entrained into the cement composition and thus the cement composition may have very good workability.

The invention claimed is:

1. An additive for a cement composition, comprising a polycarboxylic copolymer and/or a salt thereof, wherein the polycarboxylic copolymer is a copolymer of a monomer mixture comprising an alkoxy polyalkylene glycol mono(meth)acrylic acid ester-based monomer, a (meth)acrylic acid-based monomer, a (meth)acrylic acid ester-based monomer, and a polyoxyalkylene alkenyl ether sulfate salt, wherein the (meth)acrylic acid ester-based monomer is represented by Formula 3 below:

$$R^3-COO-R^4-OM^2 \qquad (3)$$

wherein $R^3$ is a $C_2$-$C_5$ hydrocarbon group containing an unsaturated bond;

$R^4$ is a $C_1$-$C_6$ hydrocarbon group; and $M^2$ is a hydrogen atom, a monovalent or divalent metal, an ammonium group, or an organic amine salt.

2. The additive according to claim 1, wherein the salt of the polycarboxylic copolymer is a copolymer salt obtained by neutralizing the polycarboxylic copolymer with an alkaline material.

3. The additive according to claim 2, wherein the alkaline material is at least one selected from the group consisting of hydroxides, chlorides and carbonates of monovalent or divalent metals, ammonia, and organic amines.

4. The additive according to claim 1, wherein the polycarboxylic copolymer is a copolymer of a monomer mixture comprising 50 to 97.5 wt % of an alkoxy polyalkylene glycol mono(meth)acrylic acid ester-based monomer, 1 to 48.5 wt % of a (meth)acrylic acid-based monomer, 1 to 48.5 wt % of a (meth)acrylic acid ester-based monomer, and 0.5 to 48 wt % of a polyoxyalkylene alkenyl ether sulfate salt.

5. The additive according to claim 1, wherein the alkoxy polyalkylene glycol mono(meth)acrylic acid ester-based monomer is represented by Formula 1 below:

$$CH_2=\overset{R^1}{\underset{|}{C}}-COO-(R^2O)_mR^3 \qquad (1)$$

wherein $R^1$ is a hydrogen atom or methyl;
$R^2O$ is $C_2$-$C_4$ oxyalkylene or a mixture of at least two kinds thereof;
$R^3$ is $C_1$-$C_4$ alkyl; and
m denotes an average addition mole number of the oxyalkylene group and is an integer of 50 to 200.

6. The additive according to claim 5, wherein the $R^2O$ group comprises a combination of at least two kinds of $C_2$-$C_4$ oxyalkylenes and is present in a block or random form.

7. The additive according to claim 5, wherein the alkoxy polyalkylene glycol mono(meth)acrylic acid ester-based monomer is at least one monomer selected from the group consisting of methoxy polyethylene glycol mono(meth)acrylate, methoxy polypropylene glycol mono(meth)acrylate, methoxy polybutylene glycol mono(meth)acrylate, methoxy polyethylene glycol polypropylene glycol mono(meth)acrylate, methoxy polyethylene glycol polybutylene glycol mono (meth)acrylate, methoxy polypropylene glycol polybutylene glycol mono(meth)acrylate, methoxy polyethylene glycol polypropylene glycol polybutylene glycol mono(meth)acrylate, ethoxy polyethylene glycol mono(meth)acrylate, ethoxy polypropylene glycol mono(meth)acrylate, ethoxy polybutylene glycol mono(meth)acrylate, ethoxy polyethylene glycol polypropylene glycol mono(meth)acrylate, ethoxy polyethylene glycol polybutylene glycol mono(meth)acrylate, ethoxy polypropylene glycol polybutylene glycol mono (meth)acrylate, and ethoxy polyethylene glycol polypropylene glycol polybutylene glycol mono(meth)acrylate.

8. The additive according to claim 1, wherein the (meth) acrylic acid-based monomer is represented by Formula 2 below:

$$R^2-COOM^1 \qquad (2)$$

wherein $R^2$ is a $C_2$-$C_5$ hydrocarbon group containing an unsaturated bond; and
$M^1$ is a hydrogen atom, a monovalent or divalent metal, an ammonium group, or an organic amine salt.

9. The additive according to claim 8, wherein the (meth) acrylic acid-based monomer of Formula 2 is at least one monomer selected from the group consisting of acrylic acid, methacrylic acid, and monovalent or divalent metal salts, ammonium salts and organic amine salts of these acids.

10. The additive according to claim 1, wherein the (meth) acrylic acid ester-based monomer of Formula 3 is at least one monomer selected from the group consisting of 2-hydroxyethyl methacrylate, hydroxypropyl methacrylate, hydroxyethyl acrylate, hydroxypropyl acrylate, and monovalent or divalent metal salts, ammonium salts and organic amine salts thereof.

11. The additive according to claim 1, wherein the polyoxyalkylene alkenyl ether sulfate salt is represented by Formula 4 below:

$$CH=\overset{R^5}{\underset{|}{C}}-\overset{H}{\underset{|}{C}}-R^6O-(R^7O)_nSO_3-M^2 \qquad (4)$$

wherein $R^5$ is a hydrogen atom or methyl;
$R^6$ is $C_1$-$C_3$ alkylene, phenylene or alkylphenylene;
$R^7$ is $C_1$-$C_4$ oxyalkylene or a mixture of at least two kinds thereof;
n denotes an average addition mole number of the oxyalkylene group and is an integer of 10 to 50; and
$M^2$ is a hydrogen atom, a monovalent metal, ammonium, or an organic amine.

12. The additive according to claim 11, wherein the $R^7$ group comprises a combination of at least two kinds of $C_1$-$C_4$ oxyalkylenes and is present in a block or random form.

13. The additive according to claim 11, wherein the polyoxyalkylene alkenyl ether sulfate salt is at least one monomer selected from the group consisting of: sulfoxypolyalkylene glycol allyl ethers, such as sulfoxypolyethylene glycol nonylphenylpropenyl ether, sulfoxypolyethylene glycol allyl ether, sulfoxypolypropylene glycol allyl ether, sulfoxypolybutylene glycol allyl ether, sulfoxypolyethylene glycol 2-butenyl ether, sulfoxypolypropylene glycol 2-butenyl ether, sulfoxypolybutylene glycol 2-butenyl ether, sulfoxypolyethylene glycol 3-butenyl ether, sulfoxypolypropylene glycol 3-butenyl ether, sulfoxypolybutylene glycol 3-butenyl ether, sulfoxypolyethylene glycol 3-pentenyl ether, sulfoxypolypropylene glycol 3-pentenyl ether, and sulfoxypolybutylene glycol 3-pentenyl ether; sulfoxypolyalkylene glycol alkylvinylphenyl ethers, such as sulfoxypolyethylene glycol (3-vinyl-5-methyl)phenyl ether, sulfoxypolypropylene glycol (3-vinyl-5-methyl)phenyl ether, sulfoxypolybutylene glycol (3-vinyl-5-methyl)phenyl ether, sulfoxypolyethylene glycol (3-vinyl-5-ethyl)phenyl ether, sulfoxypolypropylene glycol (3-vinyl-5-ethyl)phenyl ether, sulfoxypolybutylene glycol (3-vinyl-5-ethyl)phenyl ether, sulfoxypolypropylene glycol (3-propenyl-5-propyl)phenyl ether, sulfoxypolybutylene glycol (3-propenyl-5-propyl)phenyl ether, sulfoxypolyethylene glycol (3-propenyl-5-butyl)phenyl ether, sulfoxypolypropylene glycol (3-propenyl-5-butyl)phenyl ether, and sulfoxypolybutylene glycol (3-propenyl-5-butyl)phenyl ether; 2-sulfoxypolyalkylene glycol-3-(4-alkylphenoxyl) propylene allyl ethers, such as 2-sulfoxypolyethylene glycol-3-(4-methylphenoxyl)propylene allyl ether, 2-sulfoxypolypropylene glycol-3-(4-methylphenoxyl)propylene allyl ether, 2-sulfoxypolybutylene glycol-3-(4-methylphenoxyl) propylene allyl ether, 2-sulfoxypolyethylene glycol-3-(4-ethylphenoxyl)propylene allyl ether, 2-sulfoxypolypropylene glycol-3-(4-ethylphenoxyl)propylene allyl ether, and 2-sulfoxypolybutylene glycol-3-(4-ethylphenoxyl)propylene allyl ether; and monomers obtained by neutralizing the above-listed compounds with a monovalent metal, a divalent metal, an ammonium salt, or an organic amine.

14. The additive according to claim 1, wherein the additive has a weight average molecular weight of 30,000 to 70,000.

15. A cement composition comprising at least one additive selected from the group consisting of a polycarboxylic copolymer comprising a copolymer of a monomer mixture comprising an alkoxy polyalkylene glycol mono(meth)acrylic acid ester-based monomer, a (meth)acrylic acid-based monomer, a (meth)acrylic acid ester-based monomer, and a polyoxyalkylene alkenyl ether sulfate salt, and a copolymer salt obtained by neutralizing the polycarboxylic copolymer using an alkaline material, wherein the (meth)acrylic acid ester-based monomer is represented by Formula 3 below:

$$R^3\text{—COO—}R^4\text{—OM}^2 \quad (3)$$

wherein $R^3$ is a $C_2$-$C_5$ hydrocarbon group containing an unsaturated bond;

$R^4$ is a $C_1$-$C_6$ hydrocarbon group; and $M^2$ is a hydrogen atom, a monovalent or divalent metal, an ammonium group, or an organic amine salt.

16. The cement composition according to claim 15, wherein an amount of the additive is 0.01 to 10 parts by weight based on 100 parts by weight of cement.

17. A method of preventing reduction in fluidity of a cement composition, the method comprising: preparing the cement composition by adding at least one additive selected from the group consisting of a polycarboxylic copolymer comprising a copolymer of a monomer mixture comprising an alkoxy polyalkylene glycol mono(meth)acrylic acid ester-based monomer, a (meth)acrylic acid-based monomer, a (meth)acrylic acid ester-based monomer, and a polyoxyalkylene alkenyl ether sulfate salt, and a copolymer salt obtained by neutralizing the polycarboxylic copolymer using an alkaline material; and continuously entraining air into the cement composition, wherein the (meth)acrylic acid ester-based monomer is represented by Formula 3 below:

$$R^3\text{—COO—}R^4\text{—OM}^2 \quad (3)$$

wherein $R^3$ is a $C_2$-$C_5$ hydrocarbon group containing an unsaturated bond;

$R^4$ is a $C_1$-$C_6$ hydrocarbon group; and $M^2$ is a hydrogen atom, a monovalent or divalent metal, an ammonium group, or an organic amine salt.

\* \* \* \* \*